United States Patent
Bonic et al.

(10) Patent No.: US 12,367,033 B2
(45) Date of Patent: Jul. 22, 2025

(54) IDENTIFYING SIGNIFICANT CODE CHANGES VIA SYNTACTIC REPRESENTATION

(71) Applicant: Red Hat, Inc., Raleigh, NC (US)

(72) Inventors: Janos Bonic, Vienna (AT); Sanja Bonic, Vienna (AT)

(73) Assignee: Red Hat, Inc., Raleigh, NC (US)

( * ) Notice: Subject to any disclaimer, the term of this patent is extended or adjusted under 35 U.S.C. 154(b) by 164 days.

(21) Appl. No.: 17/953,967

(22) Filed: Sep. 27, 2022

(65) Prior Publication Data

US 2024/0103854 A1 Mar. 28, 2024

(51) Int. Cl.
*G06F 9/44* (2018.01)
*G06F 8/71* (2018.01)

(52) U.S. Cl.
CPC ....................... *G06F 8/71* (2013.01)

(58) Field of Classification Search
CPC ..... G06F 8/71; G06F 8/65; G06F 8/70; G06F 8/77; G06F 40/197
USPC ................................................ 717/168–178
See application file for complete search history.

(56) References Cited

U.S. PATENT DOCUMENTS

| | | | |
|---|---|---|---|
| 7,676,478 B2 * | 3/2010 | Rausch | G06F 16/283 |
| | | | 707/999.1 |
| 8,769,501 B2 | 7/2014 | Salecker et al. | |
| 8,984,485 B2 | 3/2015 | Elshishiny et al. | |
| 9,971,594 B2 | 5/2018 | Fox et al. | |
| 11,372,749 B2 * | 6/2022 | Wiener | G06F 8/71 |
| 11,693,635 B1 * | 7/2023 | Sahar | G06F 8/71 |
| | | | 717/143 |
| 2010/0088676 A1 * | 4/2010 | Yuan | G06F 16/80 |
| | | | 707/E17.005 |
| 2018/0285326 A1 * | 10/2018 | Goyal | G06F 40/197 |
| 2020/0371778 A1 | 11/2020 | Ni et al. | |

FOREIGN PATENT DOCUMENTS

| | | |
|---|---|---|
| CN | 100461132 C | 2/2009 |
| CN | 107203468 B | 9/2020 |
| CN | 112306479 A | 2/2021 |

OTHER PUBLICATIONS

Shay, Llana et al., "Measuring Whitespace Patterns in Computer Source Code as an Indication of Copying," https://www.zeidmanconsulting.com/documents/Measuring%20Whitespace%20Patterns%20In%20Computer%20Source%20Code%20as%20an%20Indication%20of%20Copying.pdf, Aug. 2010, 3 pages.

* cited by examiner

*Primary Examiner* — Chuck O Kendall
(74) *Attorney, Agent, or Firm* — Dority & Manning, P.A.

(57) ABSTRACT

A first syntactic representation of a first version of a codebase and a second syntactic representation of a second version of the codebase are generated, the codebase comprising a plurality of units of software instructions. A portion of the first syntactic representation is determined to be different than a corresponding portion of the second syntactic representation. A first version and a second version of a unit of software instructions of the plurality of units of software instructions is obtained, wherein the portion of the first syntactic representation is based on the first version of the unit of software instructions and the corresponding portion of the second syntactic representation is based on the second version of the unit of software instructions. Information descriptive of a difference between the first version of the unit of software instructions and the second version of the unit of software instructions is generated.

14 Claims, 7 Drawing Sheets

IDENTIFYING SIGNIFICANT CODE CHANGES VIA SYNTACTIC REPRESENTATION

BACKGROUND

The development of complex software codebases is usually accomplished by multiple software developers working collaboratively. Some software development projects may have dozens, or hundreds, of software developers working to develop a codebase in a collaborative manner. To do so, most software developers utilize code versioning systems. A code versioning system can record and indicate changes made to the codebase by different software developers. For example, if one software developer modifies software instructions in a codebase (e.g., adds whitespace characters, modifies non-whitespace characters, etc.), the code versioning system can indicate these changes to other software developers so that the other software developers can stay informed of any changes made to the codebase.

SUMMARY

The examples implement mechanisms for generating information descriptive of differences between versions of a codebase. A first syntactic representation of a first version of a codebase and a second syntactic representation of a second version of the codebase can be generated. The codebase can include a plurality of units of software instructions. A portion of the first syntactic representation can be determined to be different than a corresponding portion of the second syntactic representation. A first version and a second version of a unit of software instructions of the plurality of units of software instructions can be obtained. The portion of the first syntactic representation is based on the first version of the unit of software instructions and the corresponding portion of the second syntactic representation is based on the second version of the unit of software instructions. Information descriptive of a difference between the first version of the unit of software instructions and the second version of the unit of software instructions can be generated.

In one example a method is provided. The method includes generating, by a computing system comprising one or more processor devices, a first syntactic representation of a first version of a codebase and a second syntactic representation of a second version of the codebase, the codebase including a plurality of units of software instructions. The method includes determining that a portion of the first syntactic representation is different than a corresponding portion of the second syntactic representation. The method includes obtaining a first version and a second version of a unit of software instructions of the plurality of units of software instructions, wherein the portion of the first syntactic representation is based on the first version of the unit of software instructions and the corresponding portion of the second syntactic representation is based on the second version of the unit of software instructions. The method includes generating information descriptive of a difference between the first version of the unit of software instructions and the second version of the unit of software instructions.

In another example, a computing system is provided. The computing system includes memory. The computing system includes one or more processor devices coupled to the memory. The one or more processors are to generate a first syntactic representation of a first version of a codebase and a second syntactic representation of a second version of the codebase, the codebase including a plurality of units of software instructions. The one or more processors are to determine that a portion of the first syntactic representation is different than a corresponding portion of the second syntactic representation. The one or more processors are to obtain a first version and a second version of a unit of software instructions of the plurality of units of software instructions, wherein the portion of the first syntactic representation is based on the first version of the unit of software instructions and the corresponding portion of the second syntactic representation is based on the second version of the unit of software instructions. The one or more processors are to generate information descriptive of a difference between the first version of the unit of software instructions and the second version of the unit of software instructions.

In another example, a non-transitory computer-readable storage medium is provided. The non-transitory computer-readable storage medium includes executable instructions. The executable instructions are to cause a processor device to generate a first syntactic representation of a first version of a codebase and a second syntactic representation of a second version of the codebase, the codebase including a plurality of units of software instructions. The executable instructions are to cause a processor device to determine that a portion of the first syntactic representation is different than a corresponding portion of the second syntactic representation. The executable instructions are to cause a processor device to obtain a first version and a second version of a unit of software instructions of the plurality of units of software instructions, wherein the portion of the first syntactic representation is based on the first version of the unit of software instructions and the corresponding portion of the second syntactic representation is based on the second version of the unit of software instructions. The executable instructions are to cause a processor device to generate information descriptive of a difference between the first version of the unit of software instructions and the second version of the unit of software instructions.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
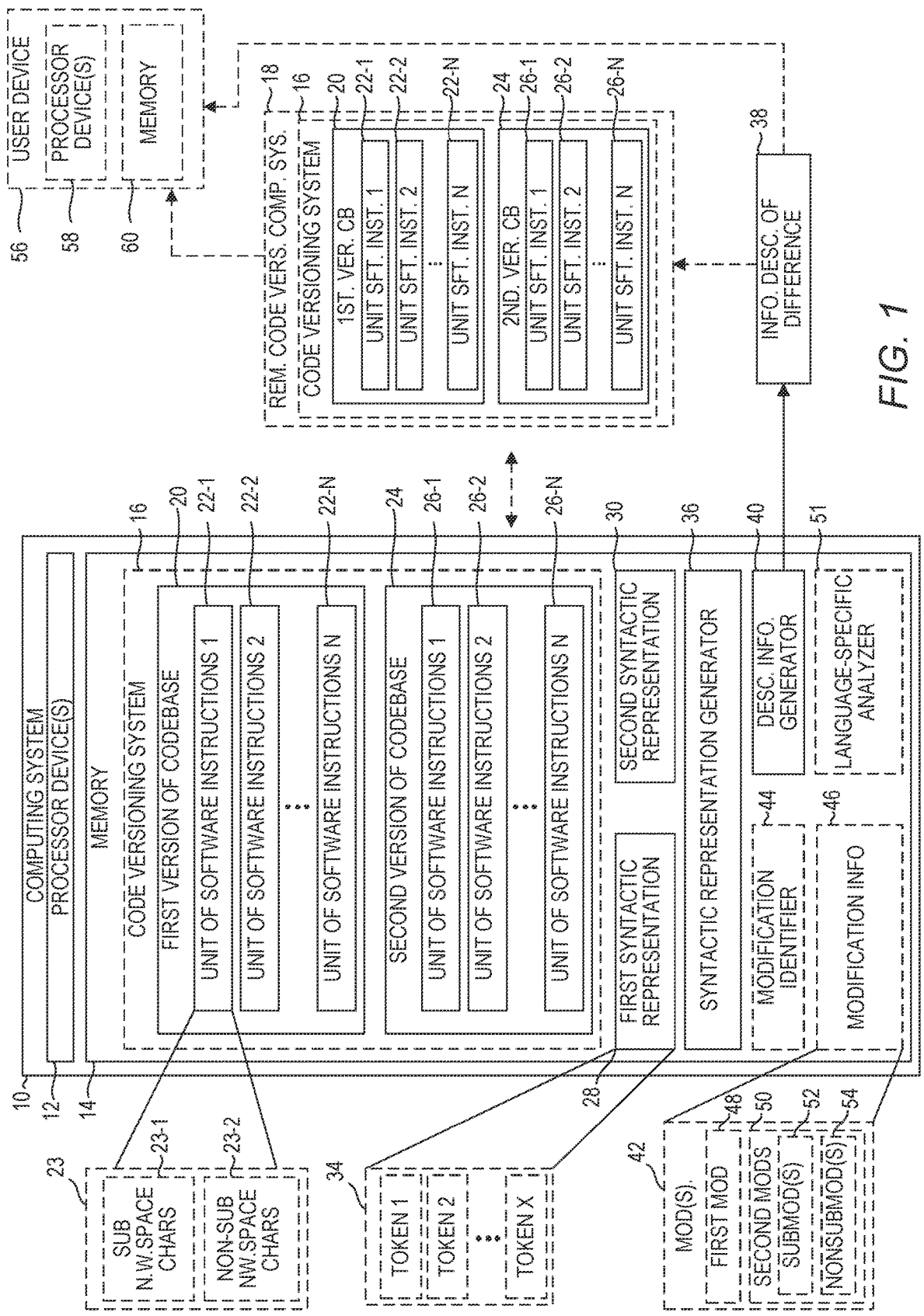
FIG. 1 is a block diagram of an environment suitable for implementing comparison of syntactic representations to identify differences between codebase versions according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

As described previously, modern software development demands increasingly large and complex codebases. To store and manage these codebases, developers often utilize code versioning systems. Code versioning systems provide a code repository in which a codebase is stored, and track modifications to the codebase that are submitted by developers. Specifically, if a developer wishes to propose modifications to a codebase, the developer can submit their proposed modifications to the code versioning system (e.g., via a "pull request"). Once the proposed modifications are received by the code versioning system, the code versioning system can apply the proposed modifications to the codebase.

Due to the complexity of modern codebases, software development processes generally require that proposed codebase modifications be rigorously verified before they are applied to the codebase to ensure that the modifications do not introduce errors, bugs, unintended effects, etc. As part of this verification process, a software developer in a more senior role will usually review codebase modifications proposed by other software developers. However, code review is considered by many software developers to be a particularly arduous mental task. As such, to assist software developers in the code review process, many code versioning systems will highlight proposed modifications to the codebase.

Specifically, code versioning systems generally display portions of the codebase in which modifications are located, and can highlight any changes to software instructions within those portions of the codebase. For example, if the modifications add software instructions, the added software instructions may be highlighted in green to indicate that they have been added. If software instructions are removed, the removed software instructions may be highlighted in green to indicate that they are to be removed. In such fashion, the reviewing software developer can more easily identify the modifications within the codebase.

Generally, modifications to a codebase often include a large number of modifications that are non-substantive (i.e., do not affect the functionality of the codebase). In particular, for codebases written in programming languages in which whitespace characters (e.g., spaces, tabs, etc.) are not syntactically significant (i.e., whitespace-insensitive languages), the majority of modifications in a pull request may be changes to whitespace characters that do not affect the functionality of the codebase. For example, modifications that change the location of a unit of software instructions within a codebase will usually include a number of modifications to tabs, empty lines, and/or spaces to organize the view or position of the software instructions within the codebase. For another example, the addition non-whitespace characters, such as curly braces, may or may not comprise a substantive modification (e.g., depending on the programming language in which the software instructions are written).

Conventional code versioning systems will generally identify the modification of whitespace characters as non-substantive, and will filter these modifications when highlighting changes to a codebase. However, the addition or removal of non-whitespace characters can also be non-substantive. For example, a unit of software instructions may be written in a programming language that is agnostic towards the inclusion of curly braces after an if-statement, and may include an if-statement that does not include curly braces. A modification to the codebase may add curly braces to the if-statement. However, although the described modifications do not affect the functionality of the codebase, and are therefore non-substantive, such modifications would be highlighted to developers by conventional code versioning systems as they include changes to non-whitespace characters.

In turn, the inability to filter non-substantive modifications to non-whitespace characters adds a substantial burden to software developers performing code review. In particular, to successfully determine whether a change to non-whitespace characters is substantive, a software developer requires a deep knowledge of the syntax rules and peculiarities of the specific programming language(s) in which the codebase is written. Requiring software developers to analyze changes to non-whitespace characters both greatly reduces the efficiency of developers and also introduces a vector for the inclusion of bugs and errors. As such, techniques that can eliminate highlighting of codebase modifications that are non-substantive are greatly desired.

Accordingly, implementations of the present disclosure propose the generation of syntactic representations to more accurately indicate substantive modifications to codebases while eliminating indication of non-substantive changes. Specifically, a computing system may store, implement, or be communicatively coupled to a codebase. For example, the computing system may implement a code versioning system that includes a code repository which stores the codebase. The computing system can generate a first syntactic representation of a first version of the codebase and a second syntactic representation of a second version of the codebase. For example, the codebase can include a plurality of units of software instructions. The computing system can obtain a first version and a second version of the codebase. The second version of the codebase can include modifications to the first version of the codebase.

These versions of the codebase can be represented via syntactic representations. It should be understood that, as described herein, a syntactic representation can be, or otherwise include, any intermediary representation of software instructions that reduces or otherwise simplifies non-substantive characters within the software instructions (e.g., whitespace characters, etc.). For example, a syntactic representation may be, or otherwise refer to, a syntactic diagram such as an abstract syntax tree that organizes software instructions in a logical flow diagram.

As syntactic representations of codebases generally represent the functionality of the codebase (i.e., how the software instructions function when executed), non-substantive changes to versions of a codebase are generally not reflected in their corresponding syntactic representations. As such, by comparing syntactic representations to determine differences between versions of codebases, implementations of the present disclosure can identify substantive modifications to the codebase while excluding any non-substantive modifications.

Furthermore, as most programs configured to render software instructions into a more machine-readable state (e.g., compilers, interpreters, etc.) generate a syntactic representation of the codebase as an intermediary step, generation of syntactic representations of versions of the codebase necessitates minimal, if any, usage of additional compute resources in comparison to conventional techniques. As such, implementations of the present disclosure provide a number of technical effects and benefits. For example, unlike conventional implementations, which may utilize resource-costly code analysis programs to identify codebase changes, implementations of the present disclosure can identify and indicate modifications to codebases through direct comparison of syntactic representations, therefore substantially reducing the quantity of resources required for identification of codebase modifications (e.g., power, memory, compute cycles, storage, bandwidth, etc.). For another example, unlike conventional techniques, implementations of the present disclosure accurately identify substantive modifications to a codebase while excluding non-substantive changes, therefore significantly increasing the efficiency of software developers.

FIG. 1 is a block diagram of an environment suitable for implementing comparison of syntactic representations to identify differences between codebase versions according to some implementations of the present disclosure. A computing system 10 includes processor device(s) 12 and memory 14. In some implementations, the computing system 10 may be a computing system that includes multiple computing devices. Alternatively, in some implementations, the computing system 10 may be one or more computing devices within a computing system that includes multiple computing devices. Similarly, the processor device(s) 12 may include any computing or electronic device capable of executing software instructions to implement the functionality described herein.

The memory 14 can be or otherwise include any device(s) capable of storing data, including, but not limited to, volatile memory (random access memory, etc.), non-volatile memory, storage device(s) (e.g., hard drive(s), solid state drive(s), etc.). In some implementations, the computing system 10 can include, implement, or can be communicatively coupled to a code versioning system 16. For example, in some implementations, the memory 14 can include a code versioning system 16. The computing system 10 may access the code versioning system 16 stored in the memory 14 to obtain different versions of a codebase or different versions of portions of the codebase. In particular, the computing system 10 may be a code versioning computing system that is configured to implement the code versioning system 16 for provision of codebase versioning services. Alternatively, in some implementations, the computing system 10 may be communicatively coupled to a remote code versioning computing system 18 that provides the code versioning system 16. The remote code versioning computing system 18 can include any computing or electronic device(s) sufficient to provide the code versioning system 16 for the computing system 10 (e.g., a cloud computing system, etc.). For example, the computing may access the code versioning system 16 implemented by the remote code versioning computing system 18 to retrieve different versions of a codebase or different versions of portions of the codebase.

The code versioning system 16 can be, or otherwise include, any collection of hardware resource(s) (e.g., computing devices, memory, etc.) and/or software sufficient to provide a repository in which a codebase can be stored. More particularly, the code versioning system 16 can be configured to store multiple versions of a codebase and track modifications between versions of the codebase. For example, in some implementations, the code versioning system 16 may store a first version of a codebase 20 and a second version of a codebase 24. The first version of the codebase 20 can include a first version of a plurality of units of software instructions 22. The second version of the codebase 24 can include a second version of a plurality of units of software instructions 26.

It should be noted that units of software instructions may be organized according to any method or schema of organizing software instructions. For example, in some implementations, each unit of software instructions may be, or may be included in, a separate file of software instructions. Alternatively, in some implementations, some units of software instructions may each be discrete units of software instructions within the same file of software instructions. As such, it should be broadly understood that a unit of software instructions refers to a discrete portion of software instructions which can be organized or separated according to any sort of organizational scheme.

More particularly, in some implementations, the first version of the codebase 20 can include a first version of a unit of software instructions 22-1, and the second version of the codebase 24 can include a second version of the unit of software instructions 26-1. It should be noted that, as described, the first version of a unit of software instructions 20-1 and the second version of the unit of software instructions 22-1 are both versions of a same unit of software instructions. For example, the first version of a unit of software instructions 20-1 may be a first version of a unit of software instructions that implements an input handling function, and the second version of the unit of software instructions 22-1 can be a second version of the same input handling function that includes one or more modifications to the first version of a unit of software instructions 20-1.

The first and second versions of the plurality of units of software instructions 22 and 26 can be written in any type of programming language, schema, or runtime environment. (e.g., C, C++, Java, Python, etc.). In particular, the first and second versions of the plurality of units of software instructions 22 and 26 can be written in programming languages that are whitespace insensitive, or in other words, programming languages in which the addition or removal of whitespace characters is not syntactically significant. Alternatively, in some implementations, the plurality of units of software instructions 22 and 26 can be written in programming languages that are whitespace sensitive. For example, the first version of the unit of software instructions 22-1 may include a plurality of characters 23. The plurality of characters 23 can include non-whitespace characters 23-1 (e.g., alphanumeric characters, punctuation characters, etc.) and whitespace characters 23-2 (e.g., tabs, spaces, empty lines, paragraph breaks, etc.).

The computing system 10 can generate a first syntactic representation 28 of the first version of the codebase 20 and a second syntactic representation 30 of the second version of the codebase 24. For example, the computing system 10 may leverage the syntactic representation generator 36 to generate the first and second syntactic representations 28 and 30. The first and second syntactic representations 28 and 30 can be any manner of intermediate representations of the respective versions of the codebases 20 and 24. For example, the first and second syntactic representations 28 and 30 may be abstract syntax trees, or some other manner of abstract syntax structure (e.g., graph, etc.). For another example, the first and second syntactic representations 28 and 30 may be a parse tree, or some other intermediate representation (e.g., a control flow graph, concrete parse tree, symbol table, data-dependence graph, etc.).

In particular, in some implementations the computing system 10 can leverage existing programs for translation of software instructions to generate the first and second syntactic representations 28 and 30 (e.g., compilers, interpreters, etc.). For example, the first version of the codebase 20 may include units of software instructions 22 that is translated into machine code or byte code using a compiler prior to execution. Often, existing compilers can generate syntactic representations of software instructions as an intermediary step during translation of the software instructions into machine code. The syntactic representation generator 36 may include the compiler, or the portion of the compiler that corresponds to generation of intermediate representations. As such, by leveraging these existing programs, the computing system 10 can generate the first and second syntactic representations 28 and 30 without requiring the storage, processing and/or and development of additional programs.

It should be noted that, as the first and second syntactic representations 28 and 30 are intermediate representations, they necessarily do not reflect non-substantive characters or instructions within the codebases they represent. For example, if the first and second versions of the codebase 20 and 24 were written in a programming language that is agnostic towards the inclusion of parenthesis when defining a variable (i.e., the addition or removal of parenthesis when defining a variable does not affect functionality), and the only differences between them was the addition or removal of parenthesis when defining a variable, then the first syntactic representation 28 and the second syntactic representation 30 can be identical, or can otherwise reflect that the versions of the codebase 20 and 24 are substantively the same.

In some implementations, the first and second syntactic representations 28 and 30 may include representative tokens. For example, the first version of the codebase 20 can include the plurality of characters 23 which includes substantive non-whitespace characters 23-1 and non-substantive non-whitespace characters 23-2. The first syntactic representation 28 can include one or more representational tokens 34 representative of the substantive non-whitespace characters 23-1. To generate the first syntactic representation 28, the computing system 10 can remove the plurality of non-substantive non-whitespace characters 23-2 from the first version of the codebase 20, and can generate the one or more representational tokens 34 based on the first version of the codebase 20. As a particular example, the computing system 10 may generate the tokens using a tokenizer, or may leverage an existing program for translation of software instructions (e.g., a compiler, interpreter, etc.) that tokenizes software instructions as an intermediary step.

In particular, the non-whitespace characters may be identified as substantive or non-substantive based on the programming language in which the characters are written, and/or their location within the unit of software instructions 22-1. In some implementations, the syntactic representation generator 36 may include a compiler, interpreter, etc. associated with the programming language that the unit of software instructions 22-1 is written. The syntactic representation generator 36 may automatically filter the non-substantive non-whitespace characters 23-2 from the unit of software instructions 22-1 as an intermediary step towards compilation, interpretation, etc., leaving only the substantive non-whitespace characters 23-1 from which the tokens 34 can be generated.

Alternatively, in some implementations, the syntactic representation generator 36 may not automatically remove non-substantive non-whitespace characters 23-2 from the unit of software instructions 22-1 as an intermediary step, causing differences between the non-substantive non-whitespace characters in the versions of the unit of software instructions 22-1 and 26-1 to be reflected in the first syntactic representation 28 and the second syntactic representation 30. In this case, the computing system 10 can utilize a language-specific analyzer 51 to identify non-substantive non-whitespace characters 23-2 and remove, or filter, changes to the characters 23-2 when generating information 38.

The computing system 10 can determine that a portion of the first syntactic representation 28 is different than a corresponding portion of the second syntactic representation 30. For example, the first syntactic representation 28 can be an abstract syntax tree representative of the first version of the codebase 20 that includes multiple nodes. The second syntactic representation 30 can be an abstract syntax tree representative of the second version of the codebase 24 that includes multiple corresponding nodes. A segment of nodes in the first syntactic representation 28 can be different than a corresponding segment of nodes in the second syntactic representation 30. Based on the differences, the computing system 10 can determine that the portion of the first syntactic representation 28 is different than the corresponding portion of the second syntactic representation 30. Determining that a portion of the first syntactic representation 28 is different than the corresponding portion of the second syntactic representation 30 will be discussed in greater detail with regards to FIG. 3.

The computing system 10 can obtain a first version of a unit of software instructions 22-1 and a second version of the unit of software instructions 26-1. For example, in some implementations, the computing system 10 may include the code versioning system 16 which can include a code repository that stores the first version of the unit of software instructions 22-1 and the second version of the unit of software instructions 26-1, and the computing system 10 can retrieve them from the memory 14. For another example, the computing system 10 may first obtain the first version of the codebase 20 and the second version of the codebase 24 (e.g., from the remote code versioning computing system 18, etc.), and then may obtain the first version of the unit of software instructions 22-1 and the second version of the unit of software instructions 26-1 from the retrieved versions of the codebase 20 and 24. Alternatively, in some implementations, the computing system 10 can retrieve the first version of the unit of software instructions 22-1 and the second version of the unit of software instructions 26-1 from a remote code versioning computing system that includes, or otherwise implements, the code versioning system 16.

The portion of the first syntactic representation 28 can be based on the first version of the unit of software instructions 22-1, and the portion of the second syntactic representation 30 can be based on the second version of the unit of software instructions 26-1. More particularly, the portion of the first syntactic representation 28 may be generated as a representation of the first version of the unit of software instructions 22-1, and the portion of the second syntactic representation 30 may be generated as a representation of the second version of the unit of software instructions 26-1.

The computing system 10 can generate information 38 descriptive of a difference between the first version of the unit of software instructions 22-1 and the second version of the unit of software instructions 26-1. For example, the computing system 10 may leverage descriptive information generator 40 to generate the information 38 descriptive of the difference between the first version of the unit of software instructions 22-1 and the second version of the unit of software instructions 26-1. In particular, the information 38 can be configured to describe, or otherwise indicate, changes that occurred between the first and second versions of the unit of software instructions to a user so that the user can more easily identify the changes.

As an example, the first version of the unit of software instructions 22-1 may be a unit of software instructions that implements a user input handling function (e.g., a function that continuously monitors for user inputs from user input devices, etc.). The function may include a variable that controls the rate at which a program implemented by the codebase monitors for user inputs. In the first version of the unit of software instructions 22-1, the variable may be set to 500 hz. In the second version of the unit of software instructions 26-1, the variable may be set to 1000 hz. The information 38 can be configured to describe, or otherwise indicate, the change from 500 hz to 1000 hz for the variable. For example, the information 38 may be configured to indicate the entire unit of software instructions, and may highlight the software instruction that includes the variable in green. For another example, the information 38 may be configured to highlight the value "500 hz" in red and highlight the value "1000 hz" in green to indicate that the value has been changed from 500 to 1000.

As another example, the first version of the unit of software instructions 22-1 may be the unit of software instructions that implements the user input handling function mentioned previously. The programming language in which the first version of the unit of software 22-1 is written may be agnostic towards the inclusion or exclusion of parenthesis when assigning a value to a variable. In the first version of the unit of software instructions 22-1, the function may be written as "variable=500". In the second version of the unit of software instructions 26-1, the function may be modified to be written as "variable=(500)". However, as the programming language is agnostic towards the inclusion of parenthesis around "500", the portion of the first syntactic representation 28 that corresponds to the first version of the unit of software instructions 22-1 may be the same as the portion of the second syntactic representation 30 that corresponds to the second version of the unit of software instructions 26-1. As such, the information 38 would not describe the difference between the first and second versions of the unit of software instructions.

In some implementations, to generate the information 38 descriptive of a difference between the first version of the unit of software instructions 22-1 and the second version of the unit of software instructions 26-1, the computing system 10 can identify a plurality of modifications 42 to the first version of the unit of software instructions 22-1 that are included in the second version of the unit of software instructions 26-1. In particular, the computing system 10 may leverage a modification identifier 44 to compare the first syntactic representation 28 and the second syntactic representation 30 to generate modification information 46 that identifies the modifications 42 (e.g., a collection of software and/or hardware configured to analyze syntactic representations). The information 38 descriptive of the differences can be information descriptive of the modifications 42.

In some implementations, the computing system 10 can determine (e.g., using the modification identifier 44, etc.) that a first modification 48 of the plurality of modifications 42 exclusively modifies a whitespace character of the first version of the unit of software instructions 22-1. The computing system 10 can further determine that a plurality of second modifications 50 of the plurality of modifications 42 each modify non-whitespace characters of the first version of the unit of software instructions 22-1. The information 38 can describe the plurality of second modifications 50 that each modify the non-whitespace characters of the first version of the unit of software instructions 22-1.

In some implementations, the computing system can determine whether modifications are substantive or non-substantive. In particular, the computing system 10 can perform a language-specific analysis based on the language the first and second versions of the unit of software instructions 22-1 and 26-1 is written in (e.g., using a language-specific analyzer 51, etc.). The language-specific analysis can identify one or more substantive modifications 52 and one or more non-substantive modifications 54 from the second modifications 50.

More specifically, in some instances modifications that are made to non-whitespace characters may still be non-substantive (i.e., functionally identical code changes). As an example, the first version of the unit of software instructions 22-1 may include a variable X that has an assigned value of:

$$X=(4*2)-1.$$

The second version of the unit of software instructions 26-1 may include a modification that removes the parenthesis so that the value is expressed as:

$$X=4*2-1.$$

Here, non-whitespace characters have been modified, and the modifications may or may not be considered substantive based on the language-specific analysis. For example, if the programming language in which the second version of the unit of software instructions 26-1 is written in evaluates operators according to a standard order of operations in a left-to-right fashion, the value (e.g., 7) will not have been changed, and therefore the modification can be considered non-substantive. If the programming language in which the second version of the unit of software instructions 26-1 is written evaluates operators in right-to-left fashion and ignores conventional order of operations, the value will have changed (e.g., from 7 to 4), and therefore the modification can be considered substantive. In such fashion, by performing the language-specific analysis with the language-specific analyzer 51, the computing system 10 can further refine the differences described by the information 38, therefore increasing the efficiency of software developers even further.

For another example, the first version of the unit of software instructions 22-1 may include an array that has an assigned value of:

array[ ]=rollercoaster

The second version of the unit of software instructions 26-1 may include a modification that adds quotation marks around the word "rollercoaster" such that:

array[ ]="rollercoaster"

Here, non-whitespace characters have been modified, and the modifications may or may not be considered substantive depending on the programming language in which the units of software are written. Assume that the quotation marks indicated above are not substantive (i.e., functionally identical code changes). In some instances, the syntactic representation generator 36, when generating the second syntactic representation 30, may automatically eliminate the quotation marks and other non-substantive non-whitespace characters, and as such, the language-specific analyzer 51 is not needed. Alternatively, in some instances, the syntactic representation generator 36, when generating the second syntactic representation 30, may not eliminate the quotation marks, and as such, the language-specific analyzer 51 can be leveraged to identify the quotation marks as non-substantive and filter the functionally identical code changes when highlighting the modifications for a software developer.

In particular, substantive modification(s) 52, as described herein, can refer to any modification included in the second version of the unit of software instructions 26-1 that is substantive, syntactically significant, or otherwise has any sort or manner of effect on the functionality of the unit of software instructions (e.g., modifying the value of a variable, modifying mathematical operators, etc.). Conversely, non-substantive modification(s) (i.e., functionally identical code changes), as described herein, can refer to any modification included in the second version of the unit of software instructions 26-1 that is not syntactically significant (e.g., replacing a space character with a line break character and a tab character in a whitespace-insensitive language, changing the order of added values in a mathematical formula, etc.). The information 38 can describe the one or more substantive modification(s) 52, and can exclude the non-substantive modification(s) 54.

In some implementations, the computing system 10 can provide the information 38 descriptive of the difference(s) between the first version of the unit of software instructions 22-1 and the second version of the unit of software instructions 26-1 to a user device 56. The user device 56 can include a processor device(s) 58 and a memory 60 as described with regards to processor device(s) 12 and 14, respectively, of the computing system 10. In particular, the user device 56 may be configured to interact with code versioning system 16 to facilitate review of codebases stored within the code versioning system 16.

For example, user device 56 may be a computing device associated with a user of the code versioning system 16 (e.g., a senior software developer who is assigned a code review task). The information 38 can be configured to, upon receipt, cause the user device 56 to depict, or otherwise describe, the differences between the first version of the unit of software instructions 22-1 and the second version of the unit of software instructions 26-1. For example, the information 38 may cause the user device 56 to highlight substantive modifications 52 to the codebase so that the software developer can more efficiently complete the code review task. In such fashion, implementations of the present disclosure can facilitate more efficient code review for complex codebases.

Figure 2:
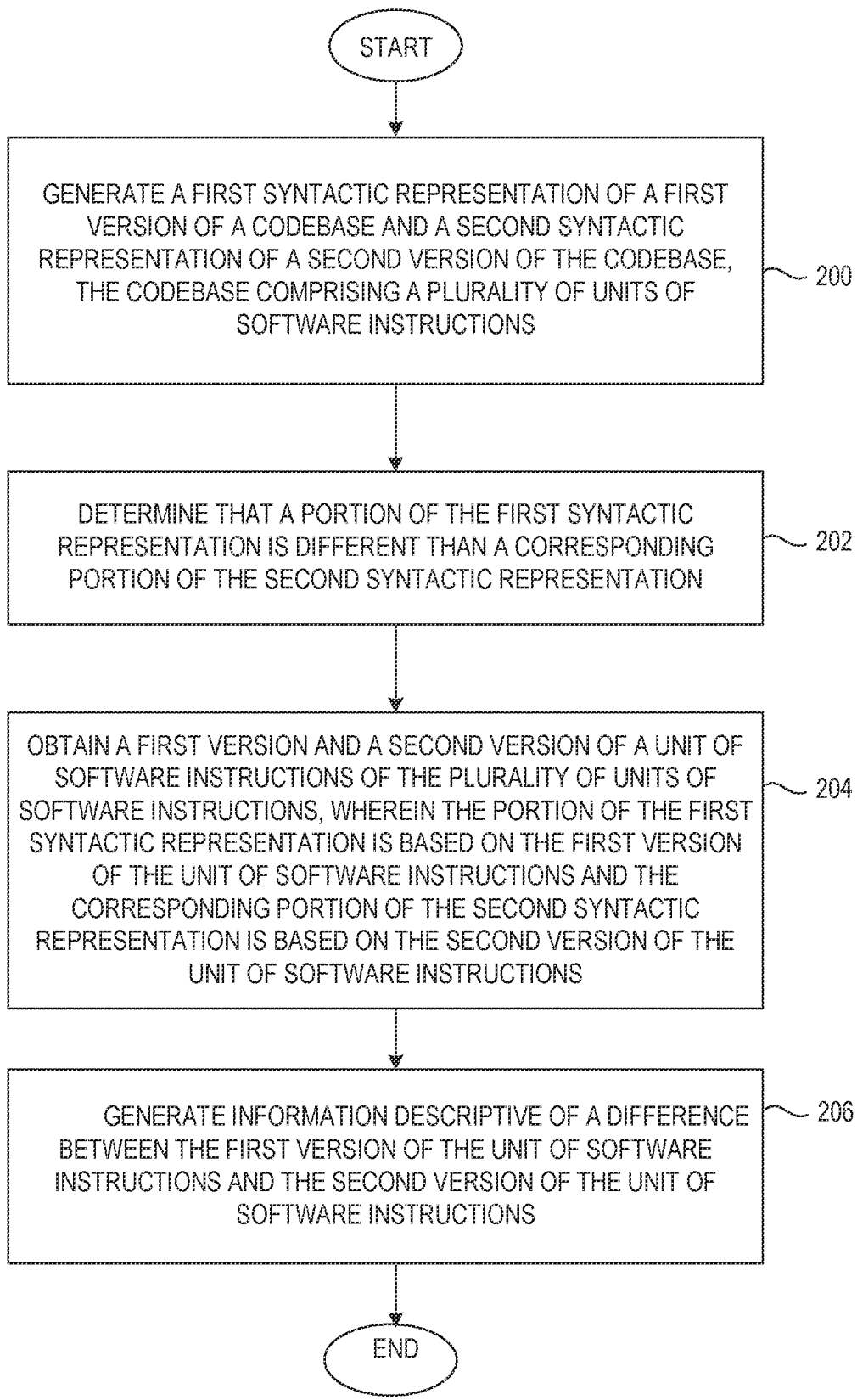
FIG. 2 is a flowchart of a method for efficient identification of substantive differences between versions of codebases according to some implementations of the present disclosure.

FIG. 2 is a flowchart of a method for efficient identification of substantive differences between versions of codebases according to some implementations of the present disclosure. FIG. 2 will be discussed in conjunction with FIG. 1.

The computing system 10 generates a first syntactic representation 28 of a first version of a codebase 20 and a second syntactic representation 30 of a second version of the codebase 24, the codebase including a plurality of units of software instructions (FIG. 2, block 200). The computing system 10 determines that a portion of the first syntactic representation 28 is different than a corresponding portion of the second syntactic representation 30 (FIG. 2, block 202). The computing system 10 obtains a first version 22-1 and a second version 26-1 of a unit of software instructions of the plurality of units of software instructions, wherein the portion of the first syntactic representation 28 is based on the first version of the unit of software instructions 22-1 and the corresponding portion of the second syntactic representation 30 is based on the second version of the unit of software instructions 26-1 (FIG. 2, block 204). The computing system 10 generates information 38 descriptive of a difference between the first version of the unit of software instructions 22-1 and the second version of the unit of software instructions 26-1 (FIG. 2, block 206).

Figure 3A:
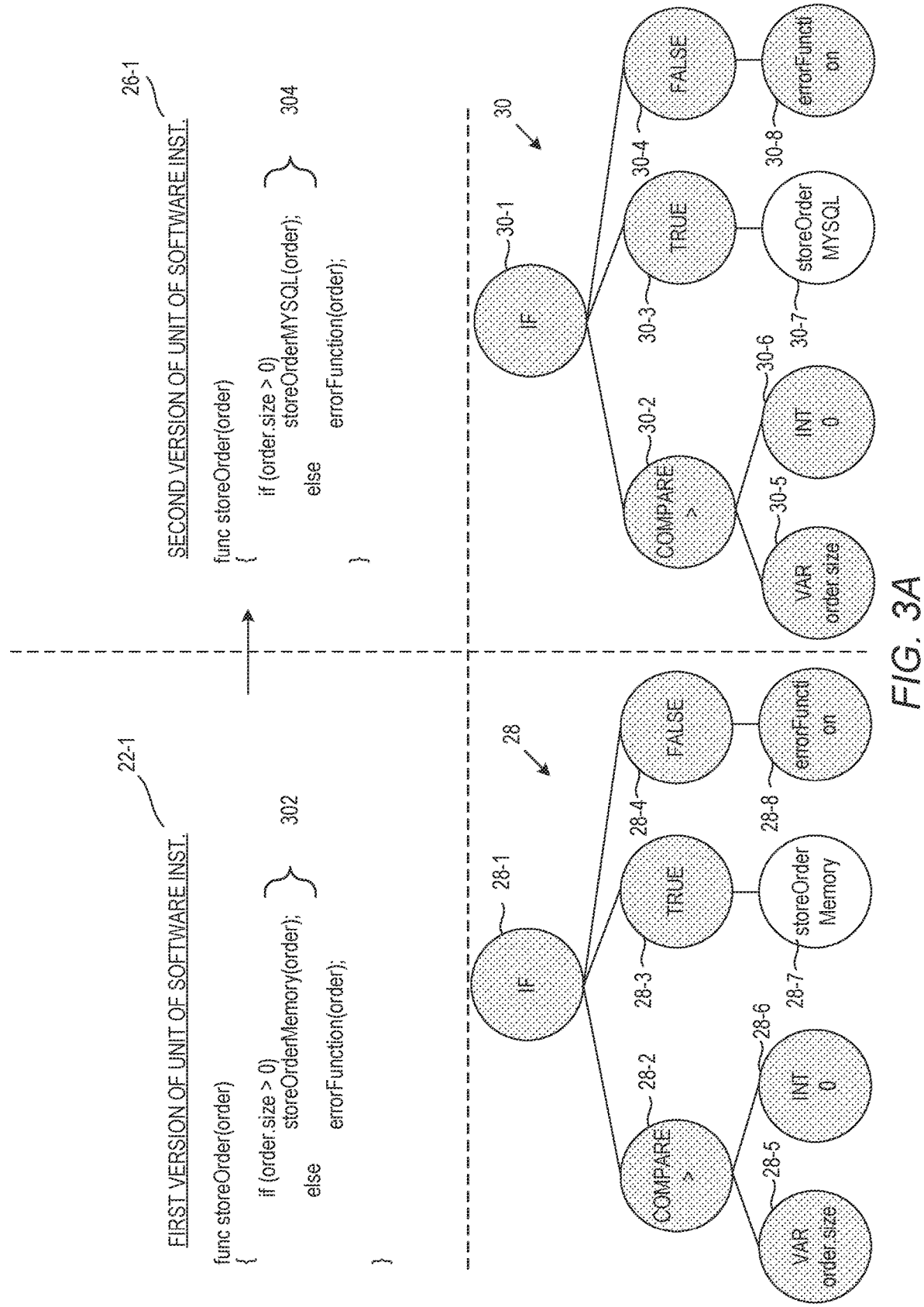
FIG. 3A illustrates an example of syntactic representation of versions of a unit of software instructions according to some implementations of the present disclosure.

FIG. 3A illustrates an example of syntactic representation of versions of a unit of software instructions according to some implementations of the present disclosure. Specifically, as depicted, the first version of the unit of software instructions 22-1 implements an order storage function func storeOrder, and the second version of the unit of software instructions 26-1 implements the same order storage function func storeOrder.

However, as depicted, the second version of the unit of software instructions 26-1 includes modifications to the first version of the unit of software instructions 22-1 that affect the functionality of the function. Specifically, in the first version of the unit of software instructions 22-1, software instruction 302 calls a function configured to store an online web order to local memory (e.g., storeOrderMemory). The second version of the unit of software instructions 26-1 replaces software instruction 302 with software instruction 304, which instead calls a function configured to store the online web order to a MYSQL database (e.g., storeOrder-MYSQL).

As described with regards to FIG. 1, syntactic representations 28 and 30 are representative of the first version of the unit of software instructions 22-1 and the second version of the unit of software instructions 26-1, respectively. As depicted, the first and second syntactic representations 28 and 30 are abstract syntax trees that include nodes representative of characters that implement the if-statement in the storeOrder function. Each portion of the abstract syntax trees can include one or more nodes.

For example, the syntactic representation 28 includes a node 28-1 that represents the initiation of the IF statement.

Node 28-3 represents fulfillment of the if-condition represented by node 28-2, and node 28-7 represents the function storeOrderMemory which is called when the if-condition is fulfilled (e.g., a portion of the syntactic representation 28). Node 30-7 of syntactic representation 30 corresponds to node 28-7 of syntactic representation 28. However, due to the modifications included in the second version of the unit of software instructions 26-1, the corresponding node 30-7 (e.g., corresponding portion) of syntactic representation 30 as generated is different than node 28-7 of syntactic representation 28. In particular, the function called responsive to fulfillment of the if-condition represented by nodes 28-3 and 30-3 has been modified to be storeOrderMYSQL rather than storeOrderMemory. By comparing the syntactic representations 28 and 30, the difference between the first version of the unit of software instructions 22-1 and the second version of the unit of software instructions 26-1 can be identified.

Figure 3B:
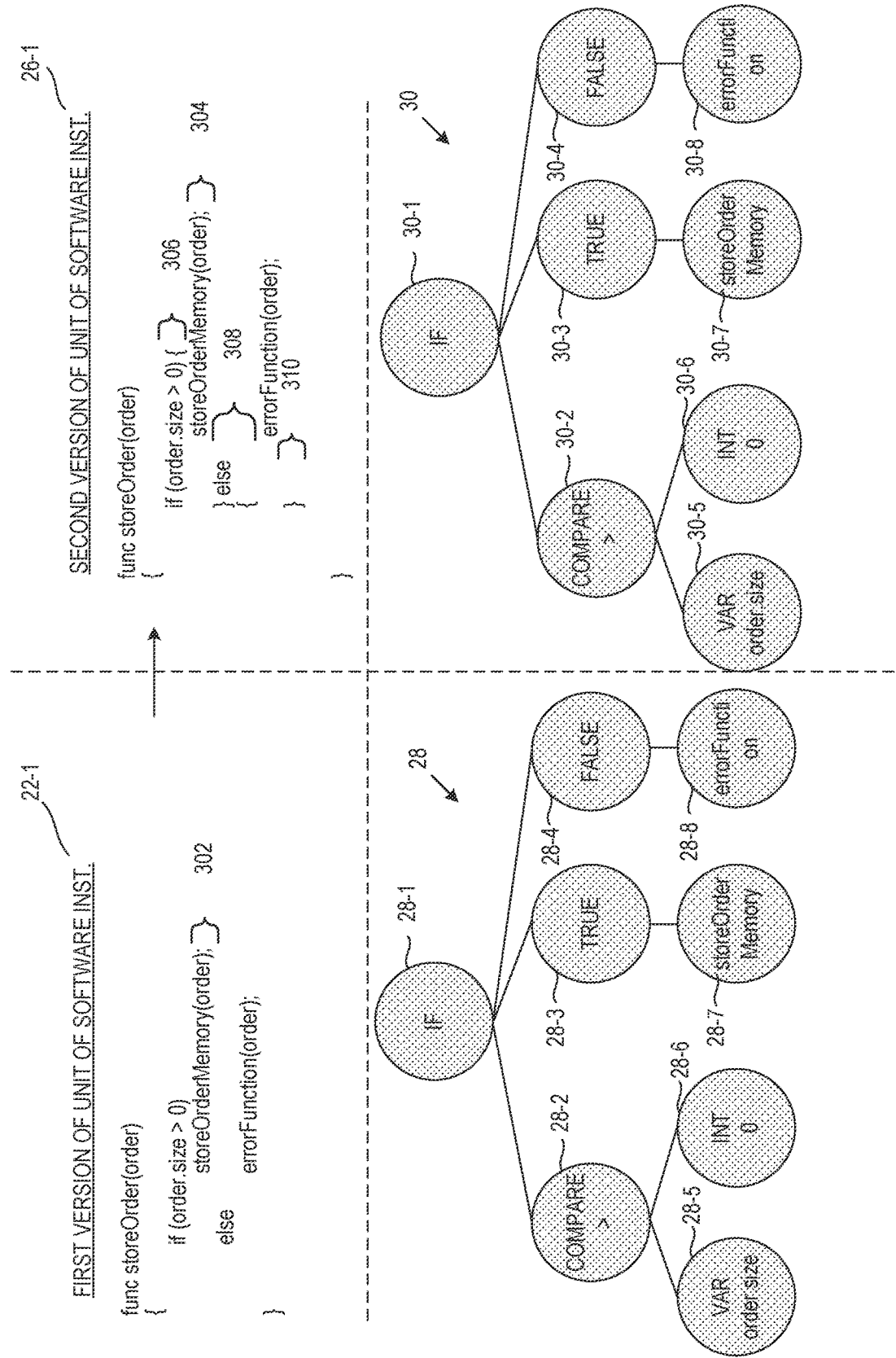
FIG. 3B illustrates another example of syntactic representation of versions of a unit of software instructions according to some implementations of the present disclosure.

FIG. 3B illustrates another example of syntactic representation of versions of a unit of software instructions according to some implementations of the present disclosure. Specifically, unlike FIG. 3A, software instructions 302 and 304 are the same across the first version of the unit of software instructions 22-1 and the second version of the unit of software instructions 26-1. Rather, software instruction 306 of the second version of the unit of software instructions 26-1 has been modified to add a curly-brace after the if-statement, software instruction 308 has been modified to add curly braces before and after the else statement, and software instruction 310 has been modified to add a curly brace after the invocation of the errorFunction.

Accordingly, as the function called at lines 302 and 304 is the same (e.g., storeOrderMemory), the nodes 28-7 and 30-7 of the syntactic representations 28 and 30 are the same. Although the second version of the unit of software instructions 26-1 includes modifications to the first version of the unit of software instructions 22-1 that adds and removes non-whitespace characters, these non-whitespace character modifications are functionally identical code changes, and therefore have not affected the composition of the syntactic representation 30. As there are no differences between syntactic representation 28 and syntactic representation 30, it can be determined that the modifications to the whitespace characters included in the second version of the unit of software instructions 26-1 are non-substantive, and therefore do not need to be indicated to a user of a code versioning system.

Figure 3C:
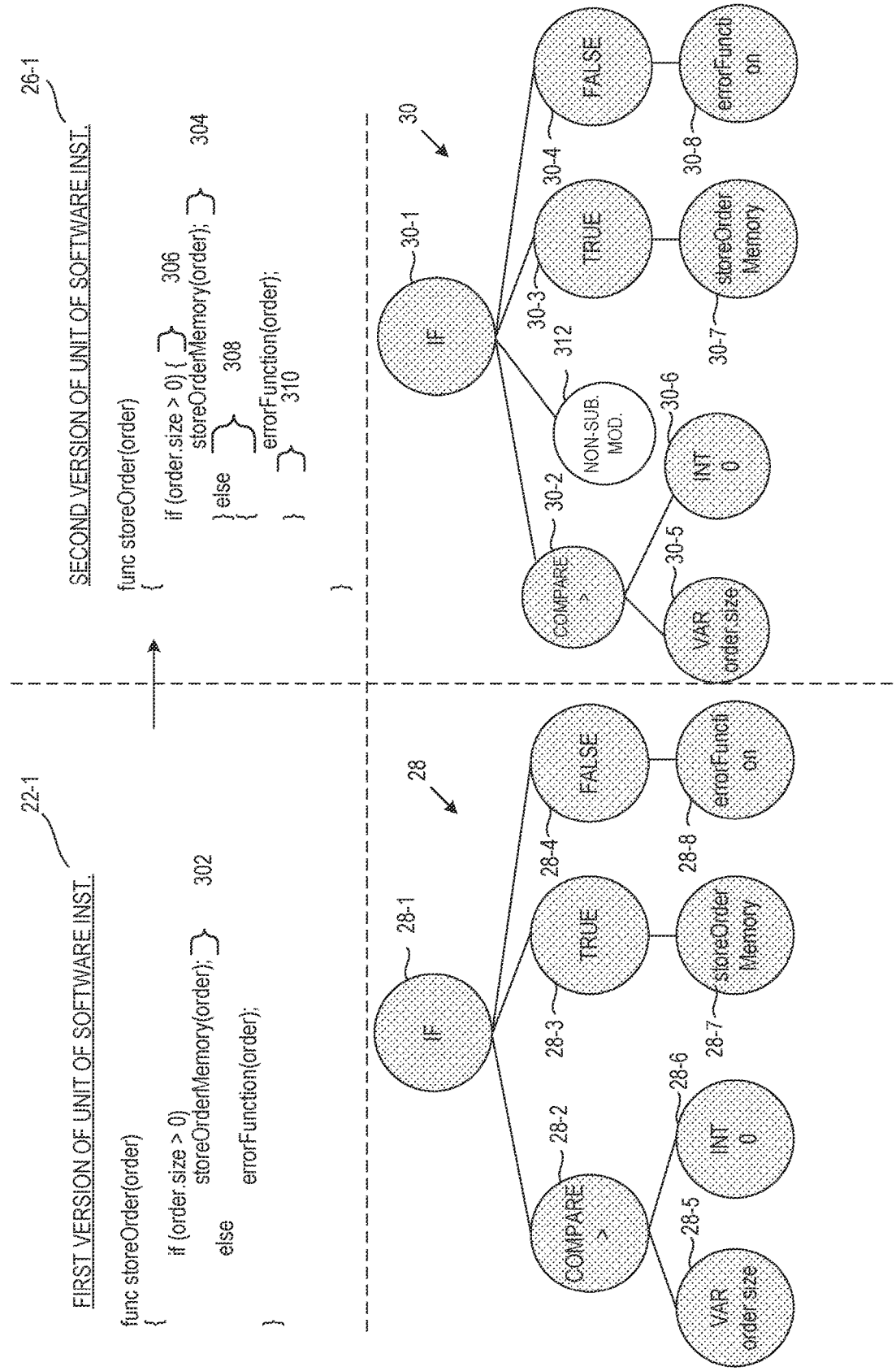
FIG. 3C illustrates another example of syntactic representation of versions of a unit of software instructions written in a programming language different than that of FIG. 3B according to some implementations of the present disclosure.

FIG. 3C illustrates another example of syntactic representation of versions of a unit of software instructions written in a programming language different than that of FIG. 3B according to some implementations of the present disclosure. Specifically, FIG. 3C includes the same modifications to software instructions 306, 308, and 310 (e.g., the inclusion of curly braces). However, unlike the software instructions of FIG. 2B, FIG. 3C is written in a programming language that, when translated into an intermediate representation, does not filter or otherwise eliminate non-substantive non-whitespace characters or changes to said characters. As such, the modifications to the first unit of software instructions 22-1 (e.g., the addition of curly braces) is captured as a node 312 in the syntactic representation 30 of the second unit of software instructions 26-1. It should be noted that node 312, as illustrated, is depicted generally to represent that the addition of curly braces to instructions 306, 308, and 310 has been captured in some manner in the syntactic representation 30. As such, the addition, placement, and/or contents of node 312 (e.g., "addition of curly braces") is not meant to be or otherwise indicate any particular programming language(s).

Once it is determined that the syntactic representation 30 is different than the syntactic representation 28, a language-specific analysis can be performed to determine whether the difference (e.g., the inclusion of node 312) is substantive or non-substantive (i.e., whether the node 312 represents a functionally identical code change). For example, the language-specific analysis may identify the language in which the unit of software instructions was written, and may determine that instructions written in the language are agnostic to the addition of curly braces. In such fashion, by leveraging a language-specific analyzer, syntactic representations of versions of codebases can be compared to filter non-substantive changes to non-whitespace characters regardless of which programming language the codebase is written.

Figure 4:
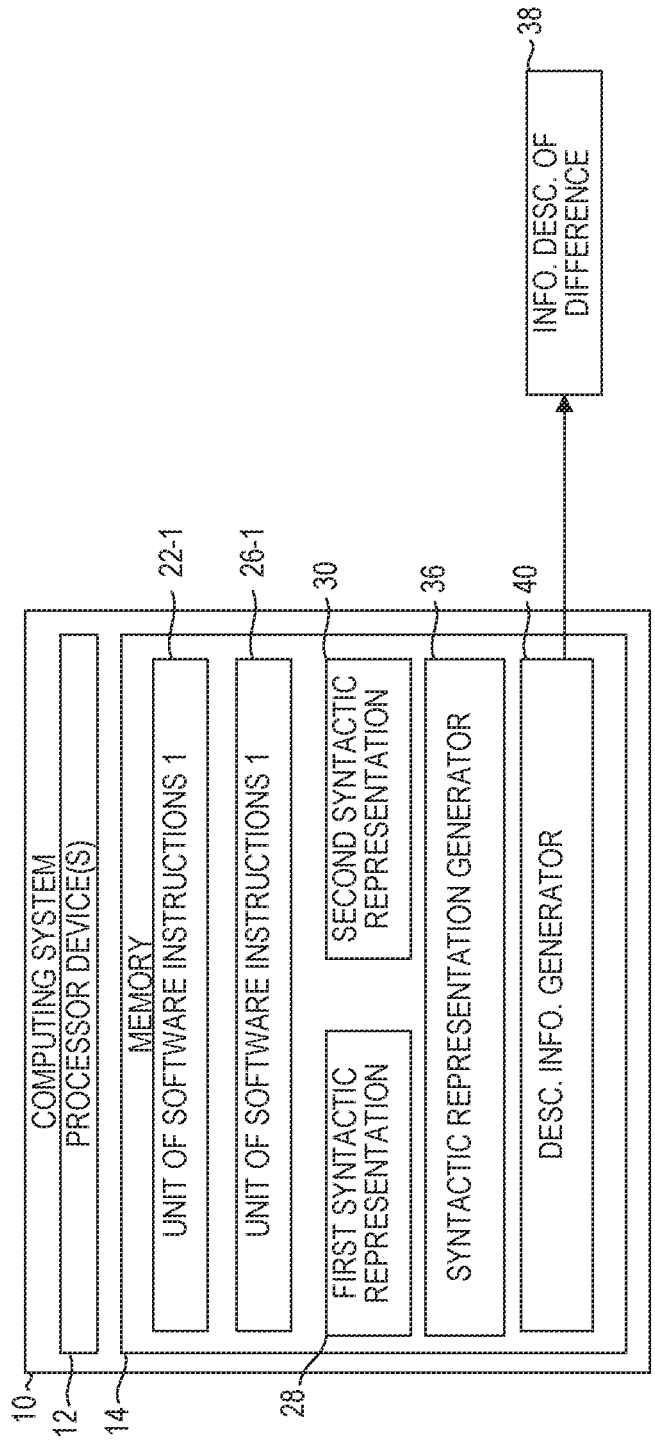
FIG. 4 is a simplified block diagram of the environment illustrated in FIG. 1 according to one implementation of the present disclosure.

FIG. 4 is a simplified block diagram of the environment illustrated in FIG. 1 according to one implementation of the present disclosure. The computing system 10 includes the memory 14 and the processor device(s) 12 coupled to the memory 14. The processor device(s) 12 is to generate a first syntactic representation 28 and a second syntactic representation 30 of a codebase that includes a plurality of units of software instructions. The processor device(s) 12 are further to determine that a portion of the first syntactic representation 28 is different than a corresponding portion of the second syntactic representation 30. The processor device(s) 12 are further to obtain a first version 22-1 and a second version 26-1 of a unit of software instructions of the plurality of units of software instructions, wherein the portion of the first syntactic representation 28 is based on the first version of the unit of software instructions 22-1 and the corresponding portion of the second syntactic representation 30 is based on the second version of the unit of software instructions 26-1. The processor device(s) 12 are further to generate information 38 descriptive of a difference between the first version of the unit of software instructions 22-1 and the second version of the unit of software instructions 26-1.

Figure 5:
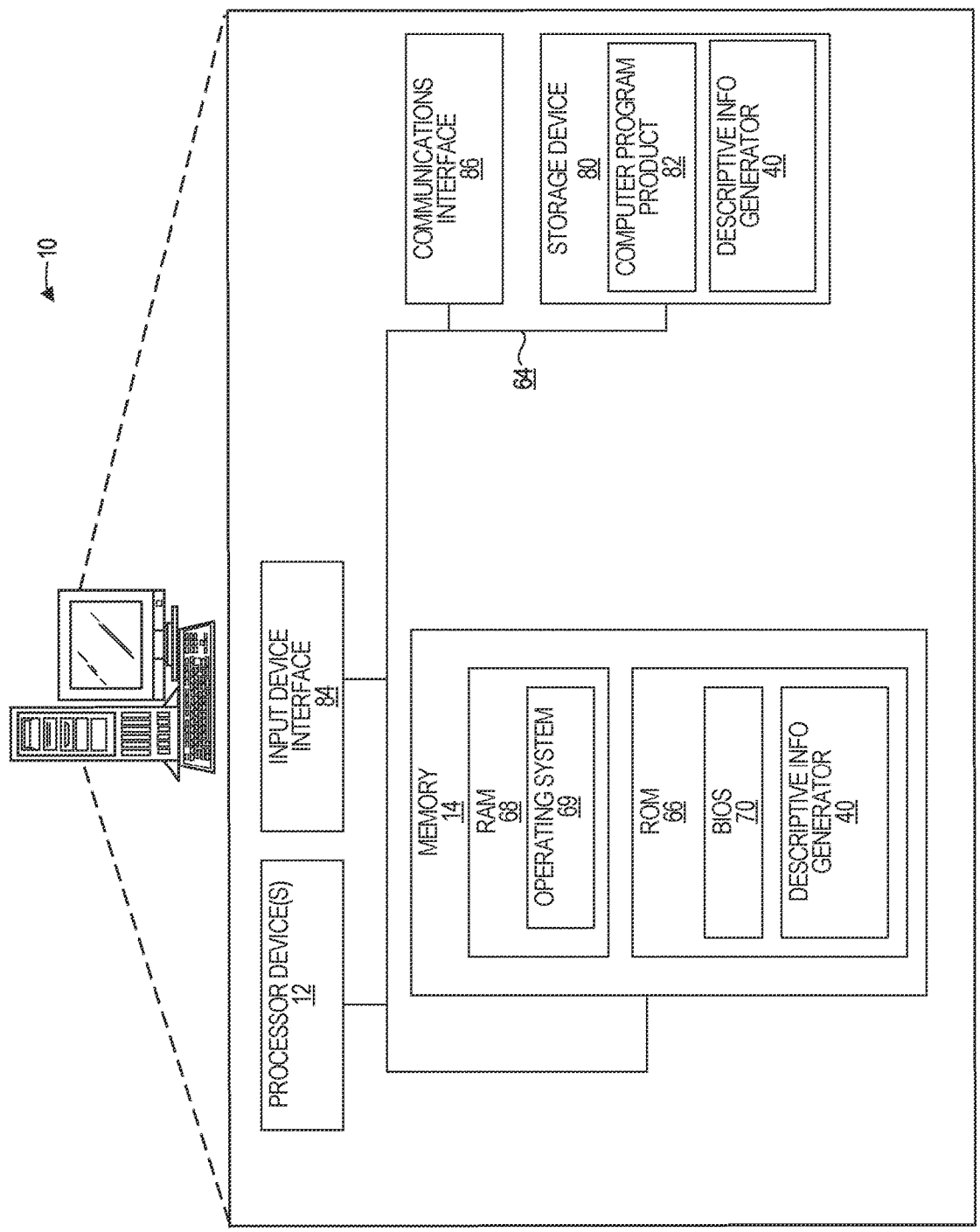
FIG. 5 is a block diagram of a source computing system suitable for implementing examples according to some implementations of the present disclosure.

FIG. 5 is a block diagram of the source computing system 10 suitable for implementing examples according to some implementations of the present disclosure. The source computing system 10 may comprise any computing or electronic device(s) capable of including firmware, hardware, and/or executing software instructions to implement the functionality described herein, such as a computer server, a desktop computing device, a laptop computing device, a smartphone, a computing tablet, or the like. The source computing system 10 includes the processor device 12, the system memory 14, and a system bus 64. The system bus 64 provides an interface for system components including, but not limited to, the system memory 14 and the processor device 12. The processor device 12 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 14 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the source computing system 10. The volatile memory 68 may also include a high-speed RAM, such as static RAM, for caching data.

The source computing system 10 may further include or be coupled to a non-transitory computer-readable storage medium such as the storage device 80, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 80 and other drives associated with computer-readable media and computer-usable media may provide non-volatile storage of data, data structures, computer-executable instructions, and the like. A number of modules can be stored in the storage device 80 and in the volatile memory 68, including an operating system and one or more program modules, such as the descriptive information generator 40, which may implement the functionality described herein in whole or in part. All or a portion of the examples may be implemented as a computer program product 82 stored on a transitory or non-transitory computer-usable or computer-readable storage medium, such as the storage device 80, which includes complex programming instructions, such as complex computer-readable program code, to cause the processor device 12 to carry out the steps described herein. Thus, the computer-readable program code can comprise software instructions for implementing the functionality of the examples described herein when executed on the processor device 12. The processor device 12, in conjunction with the descriptive information generator 40 in the volatile memory 68, may serve as a controller, or control system, for the source computing system 10 that is to implement the functionality described herein.

An operator, such as a user of a code versioning system, may also be able to enter one or more configuration commands through a keyboard (not illustrated), a pointing device such as a mouse (not illustrated), or a touch-sensitive surface such as a display device. Such input devices may be connected to the processor device 12 through an input device interface 84 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The source computing system 10 may also include a communications interface 86 suitable for communicating with a network as appropriate or desired. The source computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

The invention claimed is:

1. A method comprising:
generating, by a computing system comprising one or more processor devices, a first syntactic representation of a first version of a codebase and a second syntactic representation of a second version of the codebase, the codebase comprising a plurality of units of software instructions, wherein the first and second syntactic representations respectively represent a functionality, when executed at runtime, of each unit of software instructions of the plurality of units of software instructions of the first and second versions of the codebase;
comparing a portion of the first syntactic representation to a corresponding portion of the second syntactic representation to identify a plurality of non-whitespace modifications made to non-whitespace characters of a first unit of software instructions of the plurality of units of software instructions, wherein the portion of the first syntactic representation represents a first version of the first unit of software instructions and the corresponding portion of the second syntactic representation represents a second version of the first unit of software instructions;
obtaining the first version and the second version of the first unit of software instructions;
based on a programming language in which the first unit of software instructions is written, performing a language-specific analysis to identify a first non-whitespace modification of the plurality of non-whitespace modifications as being a non-substantive modification that does not affect the functionality of the first unit of software instructions when executed at runtime; and
generating information descriptive of a subset of the plurality of non-whitespace modifications, wherein the first non-whitespace modification is filtered from the subset of non-whitespace modifications based on the language-specific analysis.

2. The method of claim 1, wherein, prior to generating the first syntactic representation of the first version of the codebase and the second syntactic representation of the second version of the codebase, the method comprises:
obtaining the first version of the codebase and the second version of the codebase from a code versioning system that stores versions of the codebase.

3. The method of claim 2, wherein the method further comprises providing the information descriptive of the subset of the plurality of non-whitespace modifications to a computing device associated with a user of the code versioning system.

4. The method of claim 2, wherein the computing system comprises the code versioning system.

5. The method of claim 2, wherein comparing the portion of the first syntactic representation to the corresponding portion of the second syntactic representation comprises:
retrieving the first version and the second version of the first unit of software instructions of the plurality of units of software instructions from the code versioning system.

6. The method of claim 1, wherein:
the non-whitespace characters of the first version of the codebase comprise a plurality of substantive non-whitespace characters and a plurality of non-substantive non-whitespace characters;
the first syntactic representation comprises one or more representational tokens that represent the plurality of substantive non-whitespace characters; and
wherein generating the first syntactic representation of the first version of the codebase comprises:
removing the plurality of non-substantive non-whitespace characters from the first version of the codebase; and
generating the one or more representational tokens based on the first version of the codebase.

7. The method of claim 1, wherein the first syntactic representation comprises a first abstract syntax tree and the second syntactic representation comprises a second abstract syntax tree, wherein an abstract syntax tree comprises a plurality of representation tokens that each represent one or more non-whitespace characters of the plurality of units of software instructions of the codebase.

8. A computer system comprising:
a memory; and
a processor device coupled to the memory to:
generate a first syntactic representation of a first version of a codebase and a second syntactic representation of a second version of the codebase, the codebase comprising a plurality of units of software instructions, wherein the first and second syntactic representations respectively represent a functionality, when executed at runtime, of each unit of software instructions of the plurality of units of software instructions of the first and second versions of the codebase;
compare a portion of the first syntactic representation to a corresponding portion of the second syntactic representation to identify a plurality of non-whitespace modifications made to non-whitespace characters of a first unit of software instructions of the plurality of units of software instructions, wherein the portion of the first syntactic representation represents a first version of the first unit of software instructions and the corresponding portion of the second syntactic representation represents a second version of the first unit of software instructions;
obtain the first version and the second version of the first unit of software instructions;
based on a programming language in which the first unit of software instructions is written, perform a language-specific analysis to identify a first non-whitespace modification of the plurality of non-whitespace modifications as being a non-substantive modification that does not affect the functionality of the first unit of software instructions when executed at runtime; and
generate information descriptive of a subset of the plurality of non-whitespace modifications, wherein the first non-whitespace modification is filtered from the subset of non-whitespace modifications based on the language-specific analysis.

9. The computing system of claim 8, wherein, prior to generating the first syntactic representation of the first version of the codebase and the second syntactic representation of the second version of the codebase, the processor device is to:
obtain the first version of the codebase and the second version of the codebase from a code versioning system that stores versions of the codebase.

10. The computing system of claim 9, wherein the processor device is further to provide the information descriptive of the subset of the plurality of non-whitespace modifications to a computing device associated with a user of the code versioning system.

11. The computing system of claim 9, wherein the computing system comprises the code versioning system.

12. The computing system of claim 9, wherein comparing the portion of the first syntactic representation to the corresponding portion of the second syntactic representation comprises retrieving the first version and the second version of the first unit of software instructions of the plurality of units of software instructions from the code versioning system.

13. The computing system of claim 8, wherein:
the non-whitespace characters of the first version of the codebase comprise a plurality of substantive non-whitespace characters and a plurality of non-substantive non-whitespace characters;
the first syntactic representation comprises one or more representational tokens that represent the plurality of substantive non-whitespace characters; and
wherein generating the first syntactic representation of the first version of the codebase comprises:
removing the plurality of non-substantive non-whitespace characters from the first version of the codebase; and
generating the one or more representational tokens based on the first version of the codebase.

14. A non-transitory computer-readable storage medium that includes executable instructions to cause one or more processor devices to:
generate a first syntactic representation of a first version of a codebase and a second syntactic representation of a second version of the codebase, the codebase comprising a plurality of units of software instructions, wherein the first and second syntactic representations respectively represent a functionality, when executed at runtime, of each unit of software instructions of the plurality of units of software instructions of the first and second versions of the codebase;
compare a portion of the first syntactic representation to a corresponding portion of the second syntactic representation to identify a plurality of non-whitespace modifications made to non-whitespace characters of a first unit of software instructions of the plurality of units of software instructions, wherein the portion of the first syntactic representation represents a first version of the first unit of software instructions and the corresponding portion of the second syntactic representation represents a second version of the first unit of software instructions;
obtain the first version and the second version of the first unit of software instructions;
based on a programming language in which the first unit of software instructions is written, perform a language-specific analysis to identify a first non-whitespace modification of the plurality of non-whitespace modifications as being a non-substantive modification that does not affect the functionality of the first unit of software instructions when executed at runtime; and
generate information descriptive of a subset of the plurality of non-whitespace modifications, wherein the first non-whitespace modification is filtered from the subset of non-whitespace modifications based on the language-specific analysis.

* * * * *